UNITED STATES PATENT OFFICE.

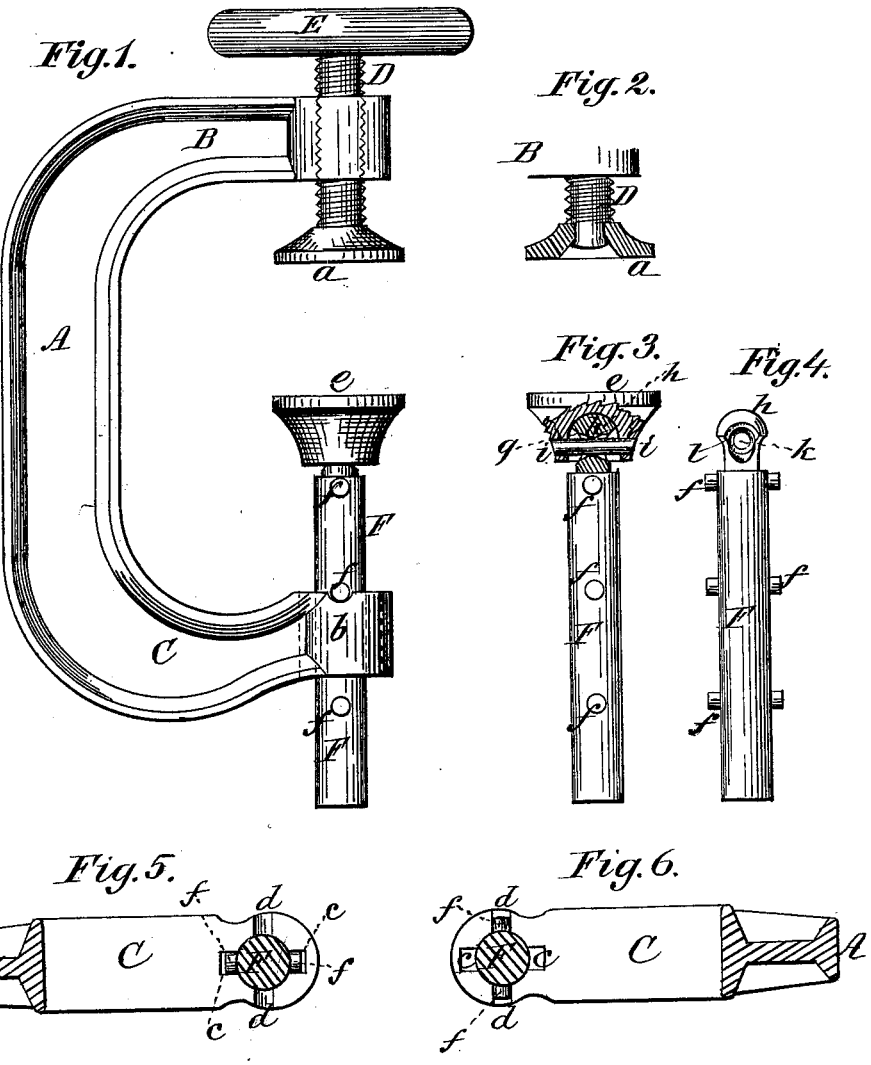

MARTIN L. EDWARDS, OF SALEM, OHIO.

IMPROVEMENT IN CLAMPS.

Specification forming part of Letters Patent No. 195,994, dated October 9, 1877; application filed April 5, 1877.

*To all whom it may concern:*

Be it known that I, MARTIN L. EDWARDS, of Salem, in the county of Columbiana, and State of Ohio, have invented certain new and useful Improvements in Adjustable Clamps, of which the following is a specification:

The object of my invention is to furnish an adjustable clamp for the use of cabinet-makers, general wood-workers, and other trades—a clamp entirely practical, simple, cheap, easily adjusted, and positive, without any springs or complication whatever.

In the accompanying drawings, Figure 1 represents an elevation of a clamp embracing my invention; Fig. 2, a sectional detail of the upper jaw; Fig. 3, a view of the adjusting-bar, showing its joint or connection with the oscillating jaw; Fig. 4, a similar view, showing the ball, the oscillating jaw being removed; Fig. 5, a horizontal section in the line $x\ x$ of Fig. 1, showing the pin projections of the adjusting-bar in the line of the way-grooves of the head; and Fig. 6, a similar section, showing said pins in the bearings of the head to support the bar in its desired place and lock it from turning.

A is the usual clamp-frame, having upper and lower arms B and C for carrying the meeting jaws. In the upper arm B, passing through its extremity, is a tightening-screw, D, operating to clamp the article to be held by a hand-wheel, E, or its equivalent, and provided at its end with a jaw, $a$, which is capable of adjustment horizontally, and has a very slight oscillating movement upon the neck of said screw D, as shown in Fig. 2.

In the extremity or head $b$ of the arm C are way-grooves $c\ c$ upon its inner wall, while upon its face, at right angles thereto, are pin or gudgeon bearings $d\ d$, said grooves and bearings being cast or formed with the head or cut out. A threadless-adjusting bar, F, passes through the head $b$, at the inner end of which is an oscillating jaw, $e$, the joint of which will be presently described.

This bar F is provided with projections $f$, which are either pins inserted through it in a manner well known to artisans, or are cast or formed with it, and which are in the same line and at suitable intervals for the purpose of adjustment. When it is desired to adjust the bar, it is raised out of bearings $d$, and turned until its projections $f$ are in line with way-grooves $c$. It is then pushed to the desired point, again turned a quadrant until its projections rest in the bearings $d$, which act both as bearings for the bar and as locks to prevent it from turning and to keep it in line with the screw-jaw. The oscillating jaw $e$ has a socket, $g$, which is made large enough to freely admit a ball, $h$, cast with the bar, or securely fastened in a socket therein. This ball is secured with the jaw by a pin, $i$, fastened in the socket sides of the jaw, and passing through an eye, $k$, in the ball, which eye has outward flarings $l$, as shown in Fig. 4, to give a small inner bearing-surface or rest for the pin $i$, and to permit of oscillation in the line of said pin. The upper part of the jaw-socket, in the act of clamping, bears directly upon the ball $h$, and there is no pressure upon the pin $i$, which is merely a securing medium. The oscillating jaw is for the purpose of meeting the object to be clamped at any angle, and its construction of joint is simple and effective, and does not permit of the lateral turning of the jaw, which would be the case with the ordinary ball-and-socket joint.

The bar F may be round or of any convenient form; if square, it could be used by having holes through it, and using a loose pin.

The operation is obvious from the description and drawing. The bar F, carrying the oscillating jaw, being adjusted to suit the size of the article to be held, said oscillating jaw accommodates itself to the surface thereof, and the hand-wheel is then operated to screw the upper jaw $a$ down to clamp it, this jaw turning only slightly until it takes hold.

I claim—

1. In an adjustable clamp, the combination of an adjusting-bar, provided with an oscillating jaw, and the clamping-screw, with its loosely-jointed jaw, for operation as described.

2. In an adjustable clamp, the combination of a threadless adjusting-bar, provided with projections at intervals in the same line, with way-grooves in the inner side of the head, substantially as and for the purpose described.

3. In an adjustable clamp, the combination of a threadless adjusting-bar, F, provided with projections $f$ at intervals in the same line, with way-grooves *c c* in the inner side of the head *b*, and gudgeon-bearings *d d* in the face of said head, substantially as and for the purpose described.

4. In an adjustable clamp, the adjusting-bar of which carries an oscillating jaw, the combination of the eyed ball *h*, socket *g* of the jaw, and pivot-pin *i*, as and for the purpose described.

In testimony whereof I have hereunto set my hand in the presence of two witnesses.

MARTIN L. EDWARDS.

Witnesses:
 THOMAS KENNETT,
 PETER AMBLER.